United States Patent
Feldpusch et al.

(10) Patent No.: US 12,160,443 B2
(45) Date of Patent: Dec. 3, 2024

(54) FLOWSPEC GATEWAY

(71) Applicant: Level 3 Communications, LLC, Broomfield, CO (US)

(72) Inventors: Michael Feldpusch, Murrells Inlet, SC (US); Christian Jensen, Westminster, CO (US); Lisa Harenski, Pittsburgh, PA (US); William Hoxworth, Westminster, CO (US)

(73) Assignee: Level 3 Communications, LLC, Denver, CO (US)

( * ) Notice: Subject to any disclaimer, the term of this patent is extended or adjusted under 35 U.S.C. 154(b) by 252 days.

(21) Appl. No.: 17/818,434

(22) Filed: Aug. 9, 2022

(65) Prior Publication Data
US 2023/0113446 A1    Apr. 13, 2023

Related U.S. Application Data

(60) Provisional application No. 63/254,606, filed on Oct. 12, 2021.

(51) Int. Cl.
*G06F 21/00* (2013.01)
*H04L 9/40* (2022.01)
*H04L 45/00* (2022.01)

(52) U.S. Cl.
CPC .......... *H04L 63/1433* (2013.01); *H04L 45/38* (2013.01); *H04L 63/0254* (2013.01); *H04L 63/1408* (2013.01)

(58) Field of Classification Search
CPC . H04L 63/1433; H04L 45/38; H04L 63/0254; H04L 63/1408; H04L 2463/142; H04L 63/1458
See application file for complete search history.

(56) References Cited

U.S. PATENT DOCUMENTS

| | | | |
|---|---|---|---|
| 2021/0203688 A1* | 7/2021 | Ghule | H04L 63/1425 |
| 2021/0258251 A1* | 8/2021 | Eastlake, III | H04L 45/74 |
| 2022/0116417 A1* | 4/2022 | Compton | H04L 63/1416 |

OTHER PUBLICATIONS

Loibl, C. et al., "Dissemination of Flow Specification Rules", *Internet Engineering Task Force (IETF)* RFC: 8955; ISSN: 2070-1721 Dec. 2020, p. 1-36.

* cited by examiner

*Primary Examiner* — Ghazal B Shehni (57) ABSTRACT

FlowSpec is a mechanism for distributing rules to routers in a network. Such rules may be used, for example, to drop traffic associated with a distributed denial of service attack. However, a malformed or incorrect FlowSpec announcement may, if distributed in the network, cause legitimate traffic to be dropped, degrading the service experienced by legitimate users. As such, systems and methods for avoiding the distribution of malformed FlowSpec announcements are provided.

19 Claims, 5 Drawing Sheets

"FLOWSPEC GATEWAY"

CROSS-REFERENCE TO RELATED APPLICATIONS

This application claims the benefit of U.S. Provisional Application No. 63/254,606 filed Oct. 12, 2021, entitled "Flowspec Gateway," which is incorporated herein by reference in its entirety.

FIELD

One or more aspects of embodiments according to the present disclosure relate to network management, and more particularly to a system and method for regulating FlowSpec filters in a network.

BACKGROUND

FlowSpec is a mechanism for efficiently distributing rules to routers, to counter distributed denial of service (DDoS) attacks on a network, for example. Malformed FlowSpec announcements, however, may degrade network performance by interfering with the flow of legitimate traffic.

It is with respect to this general technical environment that aspects of the present disclosure are related.

SUMMARY

System and methods for managing FlowSpec announcements are provided. In an aspect, a method is provided comprising receiving a first FlowSpec announcement; determining that the first FlowSpec announcement passes an acceptability test; and in response to determining that the first FlowSpec announcement passes the acceptability test, forwarding the first FlowSpec announcement to a router. In another aspect, a system is provided including a FlowSpec gateway, the FlowSpec gateway comprising a processing circuit and memory storing instructions that, when executed by the processing circuit, cause the FlowSpec gateway to perform a set of operations comprising: receiving a FlowSpec announcement; determining that the FlowSpec announcement passes an acceptability test; and in response to determining that the FlowSpec announcement passes the acceptability test, forwarding the FlowSpec announcement to a first router. This summary is provided for convenience and does not limit the scope of the present application in any way.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for managing FlowSpec announcements provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Distributed denial of service (DDoS) attacks are a relatively common type of attack that is experienced by systems or servers on the public network; some examples are web servers and content delivery networks. In such an attack, a number of attacking machines may send, to the target network, a high volume of specious requests for service that may, if suitable measures are not taken, overwhelm the target network and degrade its ability to service legitimate requests. Various methods may be employed for countering distributed denial of service attacks. For example, routers in the target network may be configured with access control lists (ACLs), which may instruct the routers to drop traffic having certain characteristics; these characteristics may be selected such that malicious traffic is dropped. Changing the ACLs for the routers in a network may, however, be a relatively slow process, requiring manual actions by the operators of the network.

FlowSpec is a mechanism for distributing rules (or "FlowSpec rules" or "FlowSpec filters") to routers in a network. Such rules may be used, for example, to drop traffic associated with a distributed denial of service attack. FlowSpec rules may be distributed, by one or more route reflectors, to the routers in a network, using the border gateway protocol (BGP) (which is a protocol for exchanging information, such as routing tables, between routers in a network). As such, FlowSpec may make it possible to rapidly distribute filtering rules among all of the BGP peer routers in a network, to counter a distributed denial-of-service attack. In some examples, as used herein, FlowSpec rules and FlowSpec announcements are any rules by which traffic through routers may be filtered in a communications network. In other examples, FlowSpec rules and FlowSpec announcements comprise flow specification rules, actions, and/or announcements specifically designed for use in BGP peer routers of a network, such as defined in Internet Engineering Taskforce (IETF) RFC 8955 and related specifications.

FlowSpec rules may be distributed as FlowSpec announcements, which are messages containing FlowSpec rules. Each announcement may include a FlowSpec action, and a traffic description. In examples where the FlowSpec announcements follow the syntax provided in IETF RFC 8955, for example, each of four exemplary FlowSpec actions is identified by respective action identifier (e.g., in the field, of the FlowSpec announcement, specifying the FlowSpec action), with 0x8006 corresponding to a FlowSpec action referred to as "traffic rate" (which is an action for traffic rate limiting), 0x8007 corresponding to a Flow- Spec action referred to as "traffic action", 0x8008 corresponding to a FlowSpec action referred to as "redirect", and 0x8009 corresponding to a FlowSpec action referred to as "traffic marking". The FlowSpec action referred to as "traffic action" (0x8007) is a method of sampling traffic on the network. The FlowSpec action referred to as "redirect" (0x8008) may redirect traffic meeting certain criteria to a particular virtual routing and forwarding (VRF) instance. Each action may also include one or more parameters; for example, the traffic rate action may include a parameter specifying the maximum permitted traffic rate, e.g., in bytes per second.

The traffic description may include fields identifying one or more of a source Internet Protocol (IP) prefix, a destination IP prefix, a transport layer protocol (e.g., whether the transport layer protocol is Transmission Control Protocol (TCP) or User Datagram Protocol (UDP)), a port number, and the like. To suppress malicious traffic (e.g., traffic associated with a distributed denial of service attack), the routers of the network may be sent a FlowSpec announcement with, for example, an action identifier of 0x8006, a rate limit of zero, and a destination IP prefix matching the prefix of an IP address of a target of the attack. Such a FlowSpec rule may cause the malicious traffic matching the traffic description of the rule to be dropped.

Similarly, a malformed or incorrect FlowSpec announcement may, if distributed in the network, cause legitimate traffic to be dropped, degrading the service experienced by legitimate users. A malformed FlowSpec announcement may be generated as a result of operator error, for example. As such, it may be advantageous for a network to incorporate a system and method for avoiding the distribution of malformed FlowSpec announcements.

Figure 1:
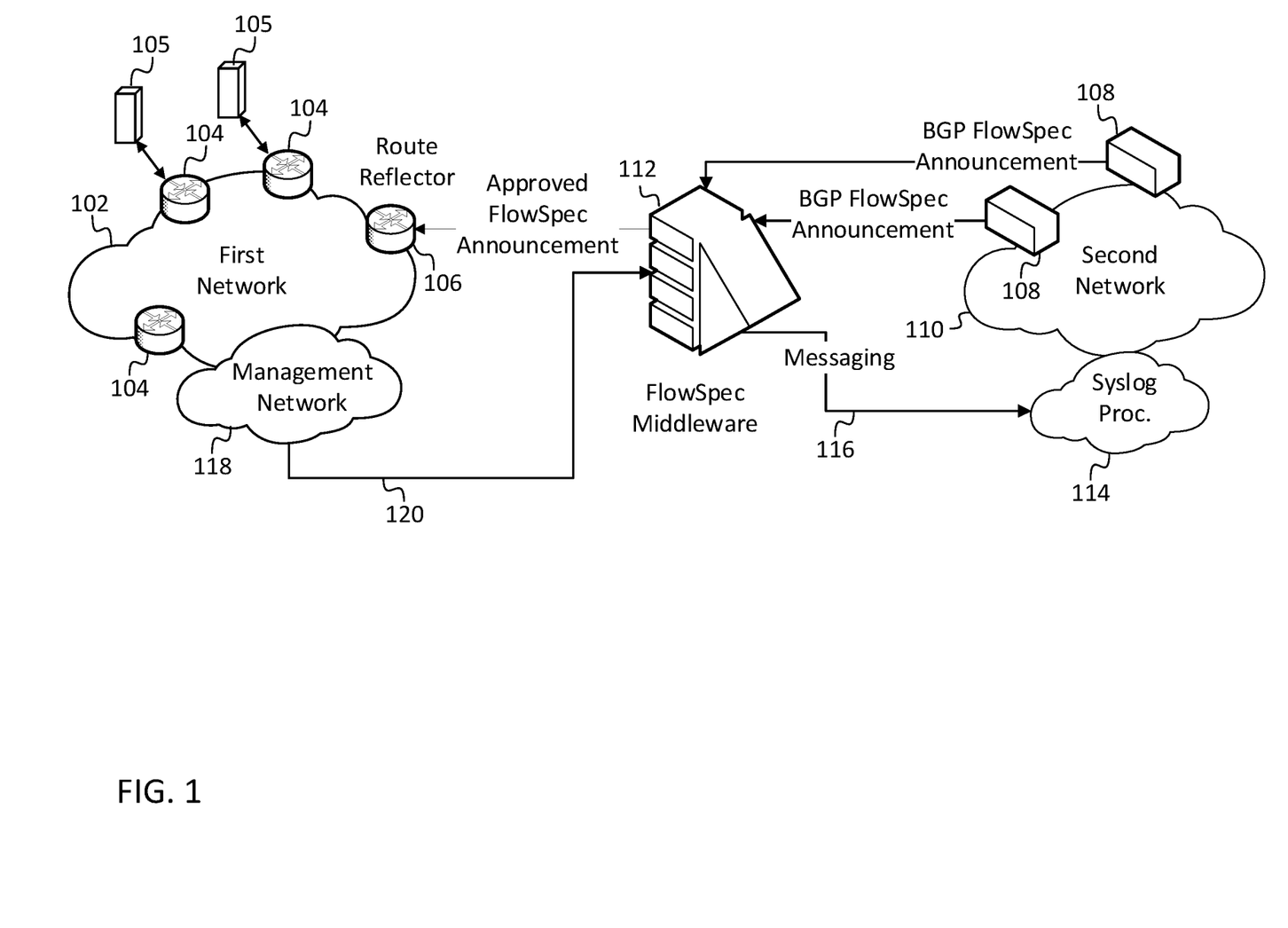
FIG. 1 is a block diagram of a system for managing FlowSpec announcements, according to an embodiment of the present disclosure.

FIG. 1 illustrates such a system, in some embodiments. A first network 102, which may be a public network, includes a plurality of routers 104 which ingest traffic, and which may apply FlowSpec rules in processing the ingested traffic. A route reflector 106 may distribute BGP messages, including FlowSpec announcements, to the routers 104. One or more monitoring devices 108 (e.g., flow collectors) may monitor traffic in the first network 102; based on the data collected by the monitoring devices 108, a determination may be made that a malicious event, such as distributed denial of service attack, is in progress, and a FlowSpec announcement may be generated (e.g., crafted by an operator, or automatically generated by an algorithm), for the purpose of mitigating the malicious event.

The monitoring devices 108 may be connected (i) to the first network 102, for purposes of monitoring traffic in the first network 102, and connected (ii) by a second network 110 (which may be an external network) to each other, and to the entity making decisions regarding FlowSpec announcements (e.g., a machine providing an operator interface, or a machine configured to assess whether a distributed denial of service attack is in progress). In some examples, the different monitoring devices 108 may be configured on separate second network(s) 110 and may not be connected to each other. Rather, different monitoring devices may be separately owned and managed while providing services in monitoring first network 102. In examples, the first network 102 and the second network 110 are different autonomous systems, each with its own autonomous system number assigned for use in border gateway protocol (BGP) routing. The FlowSpec gateway 112 may have the role of examiner, qualifier, approver, distributor, or denier. It may receive all inbound FlowSpec announcements, evaluate, approve or deny, and forward only announcements conforming to its ruleset. In examples, routers 104 may ingest traffic and discard specious traffic based on (among other things) FlowSpec rules. The remaining, legitimate traffic may be transmitted via the first network 102. In some examples, the second network 110 also operates as a content distribution network. For example, the second network 110 may receive traffic that has first been filtered by the first network 102. The second network 110 may, for example, transmit the legitimate traffic to a customer of the second network 110 (e.g., content provider using the services of the content delivery network) and transmit return traffic from the customer to first network 102. Client machines 105 may be connected to the routers 104 and may be (i) the sources of data and requests coming into the network 102 and (ii) the recipients of data delivered from the network 102 that are filtered using FlowSpec announcements that are implemented by the routers.

To reduce the risk that a flaw in the FlowSpec announcement may result in undesirable network behavior, the FlowSpec announcement may be sent (instead of being sent directly to, e.g., the route reflector 106 or to the routers 104) to a FlowSpec gateway 112. In examples, the FlowSpec gateway 112 may be configured between the monitoring devices 108 and the first network 102, such that some or all FlowSpec announcements are intercepted and/or inspected by FlowSpec gateway 112 before being forwarded to router reflector 106 or any other element of first network 102. The system may be scalable and, for example, in some embodiments, several FlowSpec gateways 112 may be present. Moreover, multiple monitoring devices 108 may be present (as shown); the monitoring devices 108 may send FlowSpec announcements to the FlowSpec gateway 112 through concurrently existing BGP sessions (i.e., multiple BGP sessions that overlap in time). The monitoring devices 108 may be configured to send FlowSpec announcements only to the FlowSpec gateway(s) 112 (e.g., the monitoring devices 108 may be configured not to send FlowSpec announcements directly to the routers 104 or to the route reflector 106). The FlowSpec gateway 112 may apply an acceptability test to each FlowSpec announcement, and, only if the FlowSpec announcement passes the acceptability test, the FlowSpec gateway 112 may forward the FlowSpec announcement to the route reflector 106 to be distributed to the routers 104. If the FlowSpec announcement does not pass the acceptability test, it may be rejected, i.e., the FlowSpec gateway 112 may decline to forward the FlowSpec announcement to the route reflector 106. In either case, the FlowSpec gateway 112 may notify, via a messaging channel 116, a syslog processing system 114 of its determination. The syslog processing system 114 may ingest such notification messages (and other messages from the FlowSpec gateway 112, as discussed in further detail below) and store them in a system log (or "syslog") or other format (e.g., in a suitable database). In some embodiments, the FlowSpec gateway 112 maintains a parallel log also storing such notification messages. Such a log may be employed for management and troubleshooting of the FlowSpec gateway 112, as discussed in further detail below. A third network, which may be a private management network 118, may provide monitoring and control capabilities for an operator, e.g., via a user interface, as discussed in further detail below. The management network 118 may be a secure network used for the purpose of management and operation of a production network (e.g., the first network 102). The management network 118 may provide connection and telemetry collection for all the network elements.

The management network 118 may be connected to the FlowSpec gateway 112 through a monitoring and configuration channel 120.

In some embodiments, parts of the system of FIG. 1 may be owned by different parties. For example, the first network 102 may be owned and/or operated by a first party providing content delivery services to the public (for customers, which may be content providers), and the monitoring devices 108 may be owned and/or by a second party, which may be a vendor of network monitoring and security services to the first party.

Figure 2:
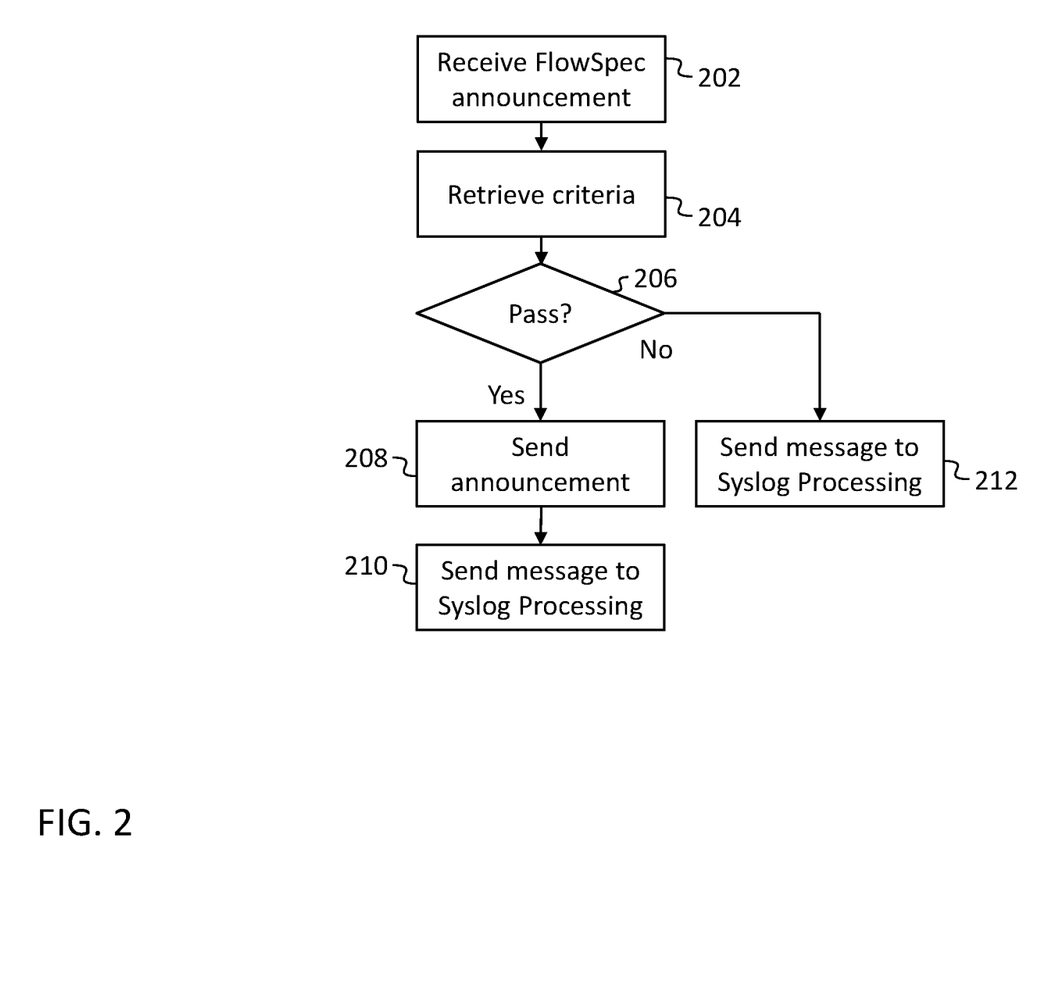
FIG. 2 is a flow chart of a method for managing FlowSpec announcements, according to an embodiment of the present disclosure.

The application of the acceptability test to a FlowSpec announcement may involve determining whether the FlowSpec announcement meets certain criteria. To make such a determination, the FlowSpec gateway 112 may proceed as illustrated in FIG. 2. At 202, the FlowSpec gateway 112 receives a FlowSpec announcement (e.g., from one of the monitoring devices 108), and at 204, the FlowSpec gateway 112 retrieves the criteria according to which the FlowSpec announcement is to be assessed. The retrieving of the criteria may involve accessing a set of whitelist definitions, e.g., retrieving a set of such definitions from a nonrelational database. The FlowSpec gateway 112 may then, at 206, apply the criteria to the FlowSpec announcement and determine whether the FlowSpec passes the acceptability test. If the FlowSpec announcement passes the acceptability test, the FlowSpec gateway 112 may, at 208, send the FlowSpec announcement to the route reflector 106 to be distributed to the routers 104 of the first network 102, and, at 210 the FlowSpec gateway 112 may send, to the syslog processing system 114, a message with its determination that the FlowSpec announcement passed the acceptability test. If the FlowSpec announcement does not pass the acceptability test, the FlowSpec gateway 112 may, at 212, send, to the syslog processing system 114, a message with its determination that the FlowSpec announcement did not pass the acceptability test.

Some or each of the criteria may involve determining whether a respective field of the FlowSpec announcement has a value that is an element of a set of allowed values for the field. For example, the criteria may be constructed in the form of one or more whitelists (e.g., one whitelist for each possible action identifier), which may be a relatively restrictive mechanism for applying the acceptability test (with the default treatment of any FlowSpec announcement being rejection). In other embodiments, the criteria may be constructed in the form of one or more blacklists (e.g., one blacklist for each possible action identifier), which may be a relatively permissive mechanism for applying the acceptability test (with the default treatment of any FlowSpec announcement being forwarding to the route reflector 106 for distribution).

The criteria to be applied may depend (as in the case, for example, in which a separate whitelist is defined for each possible action identifier) on the action identifier of the FlowSpec announcement. For example, for an action identifier of 0x8006 (for traffic rate), the acceptability test may be passed only if (i) the source IP prefix is not equal to 0.0.0.0/0 or (ii) the destination IP prefix is not equal to 0.0.0.0/0. The whitelist for an action identifier of 0x8006 may further require that the rate limit field be less than a set maximum permissible rate limit (based on the observation that if the traffic rate limit in a FlowSpec announcement is very high, it may be the result of an error). The set maximum permissible rate limit may be equal, for example, to the capacity of the router 104 having the lowest capacity among the routers 104 participating in FlowSpec. In such a case, the whitelist may include all FlowSpec announcements in which (i) the rate limit is less than the set maximum permissible rate limit, and (ii) the source IP prefix is not equal to 0.0.0.0/0 or the destination IP prefix is not equal to 0.0.0.0/0.

A similar effect may be accomplished by constructing the criteria as a set of blacklists, in which the blacklist for an action identifier of 0x8006 contains (i) FlowSpec announcements in which the source IP prefix is equal to 0.0.0.0/0, (ii) FlowSpec announcements in which the destination IP prefix is equal to 0.0.0.0/0, and (iii) FlowSpec announcements in which the rate limit is greater than the set maximum permissible rate limit. The FlowSpec gateway 112 may then accept (i.e., forward to the route reflector 106 for distribution to the routers 104) every FlowSpec announcement that does not match the blacklist.

In either case, whether configured as a whitelist or a blacklist, the FlowSpec announcements that are elements of the list may be defined, for example, by ranges of values for parameters, or by lists of values for parameters. In the blacklist example given above, for example, the list of values for the source IP prefix has a single element (0.0.0.0/0), the list of values for the destination IP prefix has a single element (0.0.0.0/0), and the set of values for rate limit is a range, extending from 0 to the set maximum permissible rate limit.

Other criteria may be applied by the FlowSpec gateway 112; for example, any FlowSpec announcement with an action identifier of 0x8006 in which either the source IP prefix or the destination IP prefix identifies a network larger than a certain maximum permissible size (e.g., larger than a network corresponding to/24 or/32) may be rejected. In some embodiments, certain action identifiers (e.g., 0x8006 (traffic rate) and 0x8009 (traffic marking)) may be permitted by the criteria (e.g., subject to further constraints, as discussed above for 0x8006), and all others may be rejected. For example, an administrator, through, e.g., management network 118, may configure FlowSpec gateway 112 to reject all FlowSpec announcements that include action identifiers 0x8007 and/or 0x8008. For example, if the criteria are configured as a set of whitelists (e.g., one whitelist per FlowSpec action) then the rejection of, e.g., 0x8007 and 0x8008 FlowSpec announcements may be effected by leaving the corresponding whitelists empty.

Action identifier 0x8009 (traffic marking) may be used by an operator modify the diffserve code point bits in the IP header of traffic in order to track and to obtain information (e.g., diagnostic information) about the traffic on the first network 102. In some embodiments, the FlowSpec gateway 112 accepts only FlowSpec announcements with an action identifier of 0x8009 (corresponding to traffic marking) with an IP prefix (e.g., a/24 or /32 IP prefix) corresponding to a network size less than or equal to a set maximum network size for traffic marking. The IP prefix may be a source prefix or a destination prefix. The nature of DDoS attacks may be such that it may not be feasible to define source prefixes effectively (the specious traffic may seem to be coming from everywhere and anywhere). In the DDoS realm, destination prefixes may be of greater interest, as these may represent the IP prefixes being protected.

Figure 3:
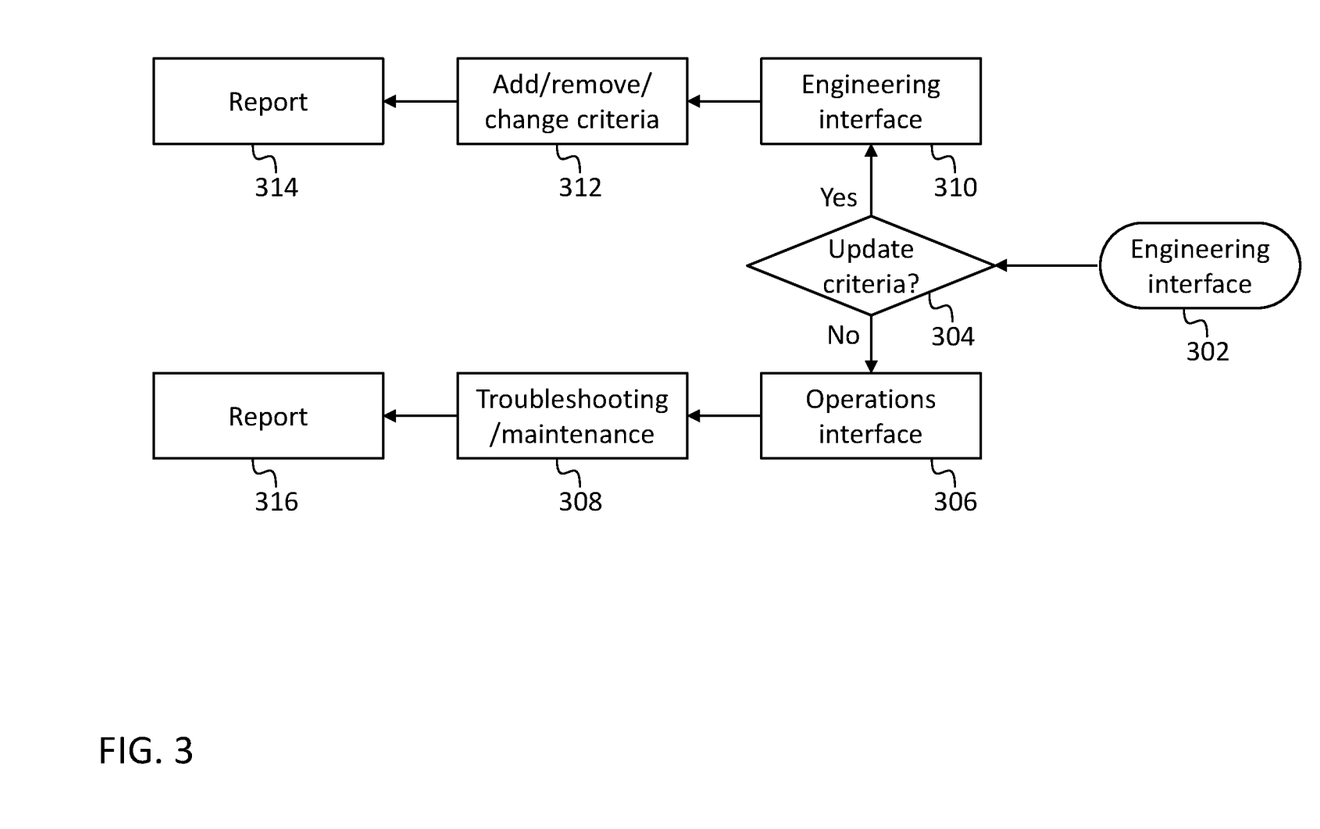
FIG. 3 is a flow chart of a method for managing the system of FIG. 1, according to an embodiment of the present disclosure.

In some embodiments, as mentioned above, the management network 118 may provide monitoring and control capabilities for an operator via a user interface. FIG. 3 shows a flow chart for such a user interface, in some embodiments. The user interface may allow an operator to manage the criteria or to perform troubleshooting or maintenance. The operator may first be presented, at 302, with an engineering interface. The operator may then be asked, at 304, whether the operator intends to update the criteria (e.g., the whitelist). If the operator wishes to update the criteria, then the operator may be presented, at 306, with an operations interface which the operator may use, at 308, to perform troubleshooting or maintenance. Troubleshooting may include, for example, determining a cause and taking corrective action if a BGP session goes down, or performing forensics, e.g., if the FlowSpec gateway 112 repeatedly receives malformed FlowSpec announcements from the same source. If the operator does not wish to update the criteria, then the operator may be presented, at 310, with an engineering interface, which the operator may use, at 312, to add, remove, or change the criteria (e.g., to add, remove, or change whitelist definitions). At 314, the message and detail of an event may be sent to, and logged in, the syslog processing system 114; for example, any changes that are made on the FlowSpec gateway 112 (e.g., updating FlowSpec criteria, troubleshooting outcomes, etc.)may be reported, at 314, to the syslog processing system 114. Similarly, the results of troubleshooting and maintenance operations may be reported, at 316, to the syslog processing system 114 and/or to another system or database.

It may be the case that the ability of some of the routers 104 to apply FlowSpec rules may be limited, with each such router 104 being capable, for example, of applying at most a certain maximum number of FlowSpec rules. As such, it may be advantageous for the system to monitor the number of FlowSpec rules being applied at any time, and, for example, for the system to avoid exceeding a certain fraction (e.g., 80%) of the capacity, of the routers 104, for applying FlowSpec rules. The route reflector 106 may provide the function of maintaining a count of the number of FlowSpec rules currently being applied, or the FlowSpec gateway 112 may provide this function. If the FlowSpec gateway 112 performs the function of limiting the number of FlowSpec rules that are applied at any time to a set maximum number of FlowSpec rules, and if a new FlowSpec announcement is received by the FlowSpec gateway 112 that, if distributed to the routers 104, would cause the limit to be exceeded, the FlowSpec gateway 112 may (i) drop the new FlowSpec announcement, or (ii) buffer the new FlowSpec announcement (assuming it passes the acceptability test) and send a message, via the messaging channel 116, to the syslog processing system 114, notifying the syslog processing system 114 that the FlowSpec announcement has not been distributed and has instead been buffered. In examples, a system administrator may then receive an alert from the syslog processing system 114 and determine whether to allow the FlowSpec announcement to be distributed and/or delete one or more other FlowSpec announcements being applied by routers 104 to ensure that the new FlowSpec announcement(s) can be applied without exceeding FlowSpec announcement limits.

Figure 4:
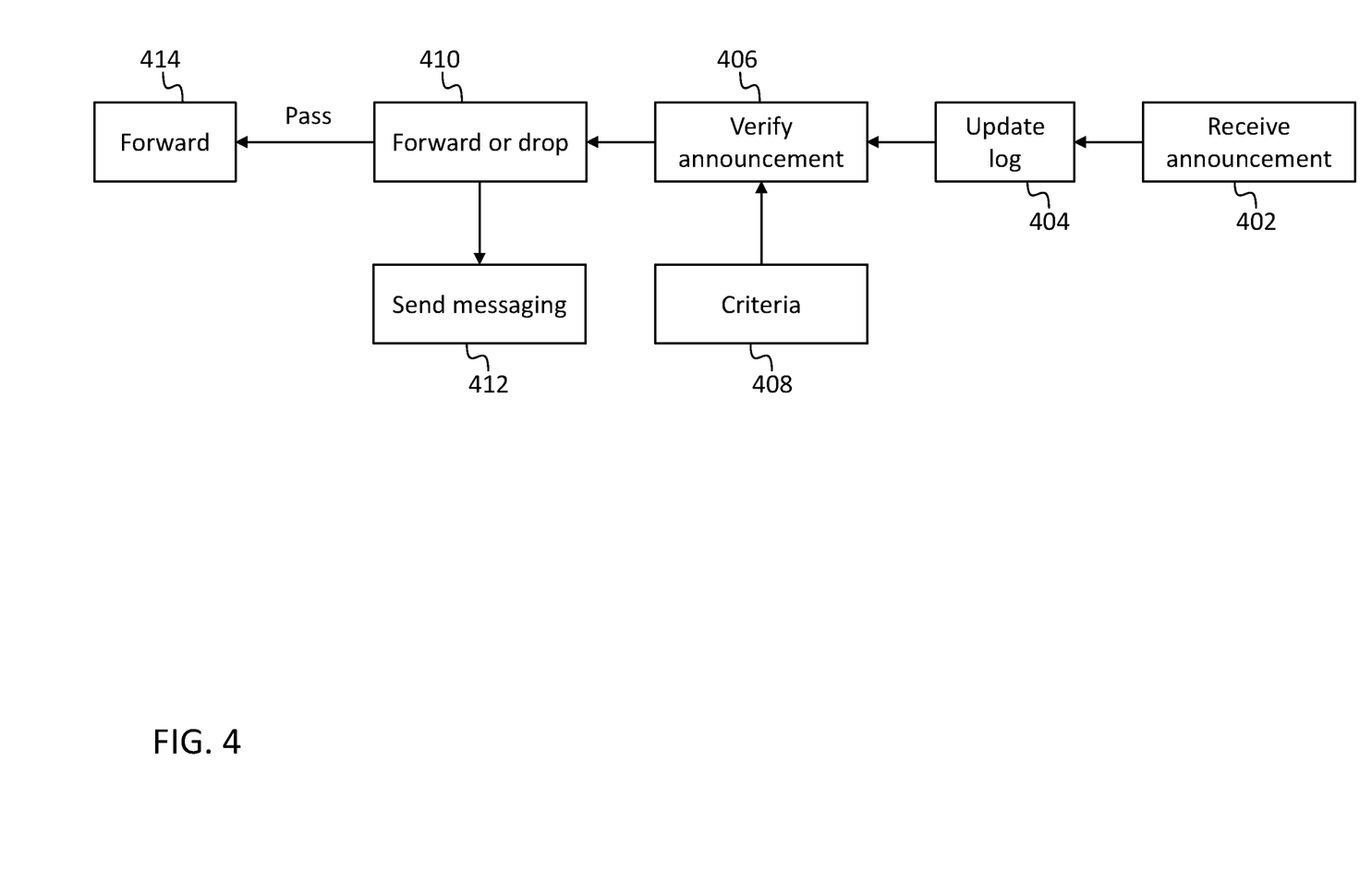
FIG. 4 is a flow chart of a method for managing FlowSpec announcements, according to an embodiment of the present disclosure.

Referring to FIG. 4, in some embodiments, the FlowSpec gateway may receive a FlowSpec announcement from potentially a variety of sources. Software running within the FlowSpec gateway may log the received FlowSpec announcement, and enter the FlowSpec announcement into an internal process that determines if the FlowSpec announcement passes the acceptability test. Suitable internal software may be employed as part of the implementation of a FlowSpec gateway 112. At 402, the internal software may receive a FlowSpec announcement, and at 404, the internal software may update a log of all received FlowSpec announcements. The internal software may then, at 406, verify the FlowSpec announcement, e.g., determine, based on the criteria 408, whether the FlowSpec announcement passes the acceptability test, and, at 412, send a message, to the syslog processing system 114, reporting the outcome of the application of the acceptability test. If the FlowSpec announcement passes the acceptability test then the internal software may forward, at 414, the FlowSpec announcement to the route reflector 106.

Figure 5:
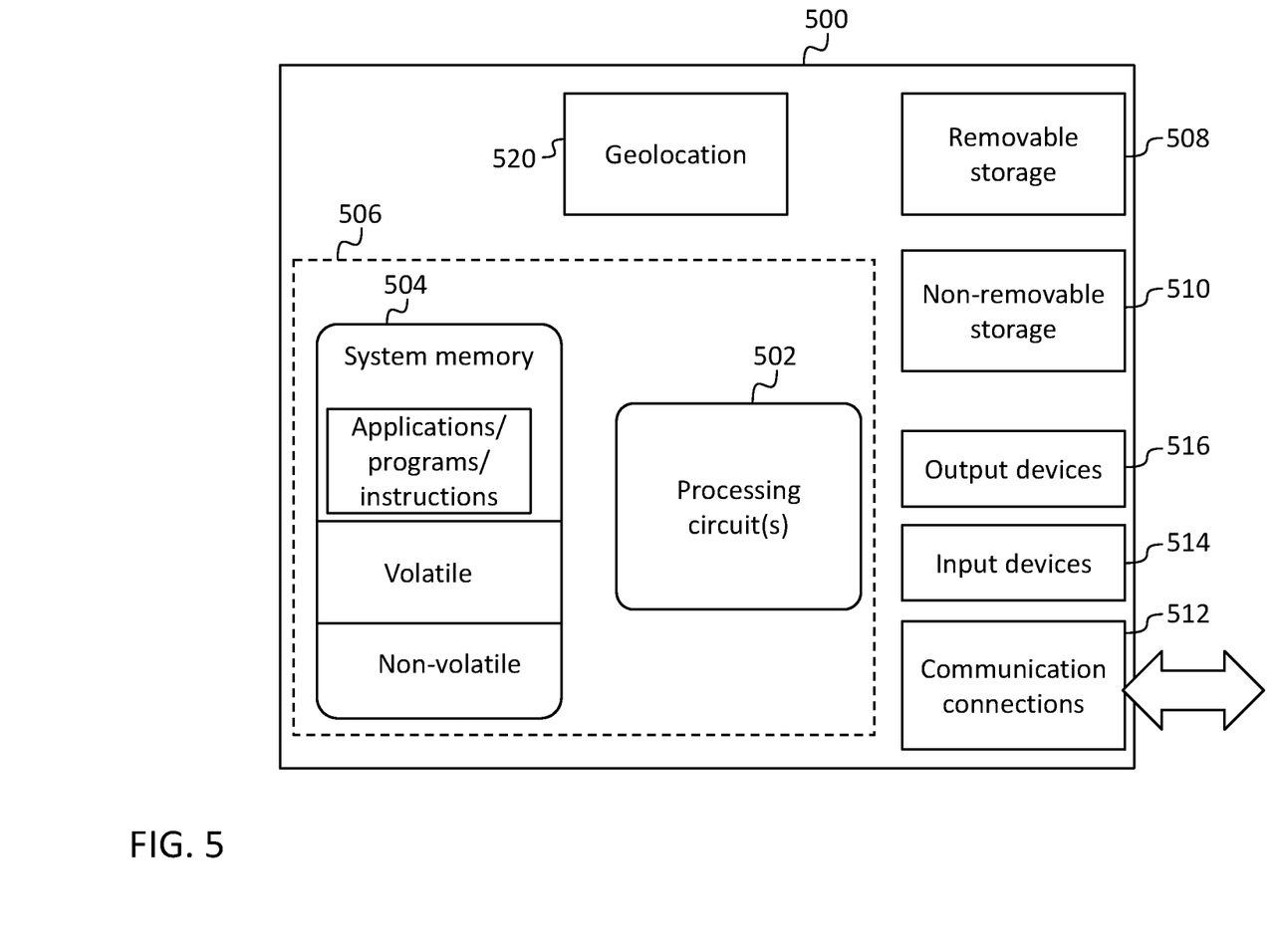
FIG. 5 is a block diagram of an example operating environment, according to an embodiment of the present disclosure.

FIG. 5 depicts an example of a suitable operating environment 500 that may be used to implement the FlowSpec gateway 112, or other computing devices within the systems discussed herein. In its most basic configuration, operating environment 500 typically includes at least one processing circuit 502 and memory 504. The processing circuit may be a processor, which is hardware. Depending on the exact configuration and type of computing device, memory 504 (storing instructions to perform the methods for managing FlowSpec announcements disclosed herein) may be volatile (such as RAM), non-volatile (such as ROM, flash memory, etc.), or some combination of the two. This most basic configuration is illustrated in FIG. 5 by dashed line 506. The memory 504 stores instructions that, when executed by the processing circuit(s) 502, perform the processes and operations described herein, such as applying the acceptability test, or forwarding a FlowSpec announcement to the route reflector 106, among other functions. Further, environment 500 may also include storage devices (removable 508, or non-removable 510) including, but not limited to, solid-state, magnetic disks, optical disks, or tape. Similarly, environment 500 may also have input device(s) 514 such as keyboard, mouse, pen, voice input, etc., or output device(s) 516 such as a display, speakers, printer, etc. Additional communication connections 512 may also be included that allow for further communication with LAN, WAN, point-to-point, etc. Operating environment 500 may also include geolocation devices 520, such as a global positioning system (GPS) device.

Operating environment 500 typically includes at least some form of computer readable media. Computer readable media can be any available media that can be accessed by processing circuit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media is non-transitory and does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of any of the above should also be included within the scope of computer readable media.

As used herein, the word "or" is inclusive, so that, for example, "A or B" means any one of (i) A, (ii) B, and (iii) A and B. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

Although exemplary embodiments of a system and method for managing FlowSpec announcements have been specifically described and illustrated herein, many modifications and variations will be apparent to those skilled in the art. Accordingly, it is to be understood that a system and method for managing FlowSpec announcements constructed according to principles of this disclosure may be embodied other than as specifically described herein. The invention is also defined in the following claims, and equivalents thereof.

What is claimed is:

1. A method, comprising:
   receiving a first FlowSpec announcement;
   determining that the first FlowSpec announcement passes an acceptability test;
   in response to determining that the first FlowSpec announcement passes the acceptability test, forwarding the first FlowSpec announcement to a router;
   receiving, from the router, a message indicating the number of FlowSpec rules currently being applied;
   determining that the number of FlowSpec rules currently being applied equals a set maximum number of FlowSpec rules;
   receiving a second FlowSpec announcement;
   determining that the second FlowSpec announcement passes the acceptability test; and
   in response to determining that the second FlowSpec announcement passes the acceptability test and that the number of FlowSpec rules currently being applied equals the set maximum number of FlowSpec rules:
   not forwarding the second FlowSpec announcement to the router; and
   sending, to a syslog processing system, a report indicating that the second FlowSpec announcement has not been distributed.

2. The method of claim 1, further comprising:
   determining that the second FlowSpec announcement does not pass the acceptability test; and
   in response to determining that the second FlowSpec announcement does not pass the acceptability test, not forwarding the second FlowSpec announcement to the router.

3. The method of claim 1, wherein the determining that the first FlowSpec announcement passes the acceptability test comprises determining that a field of the first FlowSpec announcement has a value that is an element of a set of allowed values for the field.

4. The method of claim 3, wherein:
   the field is the action code field of the first FlowSpec announcement,
   the value of the field is the action code for traffic rate limiting, and
   the set of allowed values includes the action code for traffic rate limiting.

5. The method of claim 4, wherein the determining that the first FlowSpec announcement passes the acceptability test further comprises determining that a rate limit field of the first FlowSpec announcement has a value less than a set maximum permissible rate limit.

6. The method of claim 4, wherein the determining that the first FlowSpec announcement passes the acceptability test further comprises determining that a source IP prefix of the first FlowSpec announcement falls within a set range.

7. The method of claim 6, wherein the set range is the range of IP prefixes not equal to 0.0.0.0/0.

8. The method of claim 4, wherein the determining that the first FlowSpec announcement passes the acceptability test further comprises determining that a destination IP prefix of the first FlowSpec announcement falls within a set range.

9. The method of claim 8, wherein the set range is the range of IP prefixes not equal to 0.0.0.0/0.

10. The method of claim 4, further comprising:
    establishing a first border gateway protocol (BGP) session between a first monitoring device and a FlowSpec gateway,
    wherein the receiving of the first FlowSpec announcement comprises receiving the first FlowSpec announcement, by the FlowSpec gateway, in the first BGP session.

11. The method of claim 10, further comprising:
    establishing a second BGP session between a second monitoring device and the FlowSpec gateway, the second BGP session existing concurrently with the first BGP session;
    receiving a second FlowSpec announcement, by the FlowSpec gateway, in the second BGP session;
    determining that the second FlowSpec announcement passes the acceptability test; and
    in response to determining that the second FlowSpec announcement passes the acceptability test, forwarding the second FlowSpec announcement to the router.

12. The method of claim 3, wherein:
    the field is the action code field of the first FlowSpec announcement,
    the value of the field is the action code for traffic marking, and
    the set of allowed values includes the action code for traffic marking.

13. The method of claim 12, wherein the determining that the first FlowSpec announcement passes the acceptability test further comprises determining that a network size corresponding to an IP prefix field of the first FlowSpec announcement is less than or equal to a set maximum network size for traffic marking.

14. The method of claim 12, wherein the determining that the first FlowSpec announcement passes the acceptability test further comprises determining that the autonomous system number of the origin of the first FlowSpec announcement is among a list of acceptable autonomous system numbers.

15. The method of claim 1, further comprising sending, to a syslog processing system, a report indicating that the first FlowSpec announcement passes the acceptability test.

16. The method of claim 1, further comprising buffering the second FlowSpec announcement.

17. A system, comprising:
 a FlowSpec gateway, the FlowSpec gateway comprising a processing circuit and memory storing instructions that, when executed by the processing circuit, cause the FlowSpec gateway to perform a set of operations comprising:
 receiving a FlowSpec announcement;
 determining that the FlowSpec announcement passes an acceptability test;
 in response to determining that the FlowSpec announcement passes the acceptability test, forwarding the FlowSpec announcement to a first router;
 receiving, from the first router, a message indicating the number of FlowSpec rules currently being applied;
 determining that the number of FlowSpec rules currently being applied equals a set maximum number of FlowSpec rules;
 receiving a second FlowSpec announcement;
 determining that the second FlowSpec announcement passes the acceptability test; and
 in response to determining that the second FlowSpec announcement passes the acceptability test and that the number of FlowSpec rules currently being applied equals the set maximum number of FlowSpec rules:
 not forwarding the second FlowSpec announcement to the router; and
 sending, to a syslog processing system, a report indicating that the second FlowSpec announcement has not been distributed.

18. The system of claim 17, wherein:
 the first router is configured to operate as a route reflector,
 the system further comprises a second router, the second router being a FlowSpec-enabled router, and
 the first router is configured to forward the FlowSpec announcement to the second router.

19. The system of claim 17, wherein the determining that the FlowSpec announcement passes the acceptability test comprises determining that a field of the FlowSpec announcement has a value that is an element of a set of allowed values for the field.

* * * * *